(12) United States Patent
Ramanathan

(10) Patent No.: US 10,474,726 B2
(45) Date of Patent: Nov. 12, 2019

(54) GENERATION OF DIGITAL DOCUMENTS

(71) Applicant: ENTIT SOFTWARE LLC, Sunnyvale, CA (US)

(72) Inventor: Krishnan Ramanathan, Bangalore (IN)

(73) Assignee: MICRO FOCUS LLC, Santa Clara, CA (US)

(*) Notice: Subject to any disclaimer, the term of this patent is extended or adjusted under 35 U.S.C. 154(b) by 191 days.

(21) Appl. No.: 15/544,338

(22) PCT Filed: Jan. 30, 2015

(86) PCT No.: PCT/IN2015/000060
§ 371 (c)(1),
(2) Date: Jul. 18, 2017

(87) PCT Pub. No.: WO2016/120883
PCT Pub. Date: Aug. 4, 2016

(65) Prior Publication Data
US 2018/0144054 A1 May 24, 2018

(51) Int. Cl.
*G06F 7/02* (2006.01)
*G06F 16/00* (2019.01)
(Continued)

(52) U.S. Cl.
CPC ........ *G06F 16/9535* (2019.01); *G06F 16/958* (2019.01); *G06F 17/2745* (2013.01); *G06F 17/2785* (2013.01)

(58) Field of Classification Search
CPC .... G06F 16/9535; G06F 16/958; G06F 16/00; G06F 16/951; G06F 17/2745;
(Continued)

(56) References Cited

U.S. PATENT DOCUMENTS 7,266,767 B2 9/2007 Parker
8,271,495 B1 * 9/2012 Skrenta ................. G06F 16/954
707/738
(Continued)

FOREIGN PATENT DOCUMENTS

CN 101826102 A 9/2010
CN 102687166 A 9/2012
WO WO-2005071572 A1 8/2005

OTHER PUBLICATIONS

Joel Mathis, iBooks Author Offers Free Dynamic ebook Creation, <http://www.difitalartsonline.co.uk/news/interactive-design/ibooks-author-offers-free-dynamic-ebook-creation/>.
(Continued)

*Primary Examiner* — Bruce M Moser

(57) ABSTRACT

The present subject matter relates to generating a digital document. In one example, the present subject matter includes generating one or more seed topics based on topic-based textual data. The present subject matter further includes determining a list of candidate topics based on the one or more seed topics, where each candidate topic is associated with content corresponding to the candidate topic. Further, the present subject matter includes selecting a candidate topic from amongst the candidate topics, where the candidate topic is selected based on a pre-defined selection rule, and generating the digital document based on content associated with the candidate topic selected from amongst the candidate topics.

13 Claims, 5 Drawing Sheets

(51) Int. Cl.
*G06F 16/9535* (2019.01)
*G06F 17/27* (2006.01)
*G06F 16/958* (2019.01)

(58) Field of Classification Search
CPC .............. G06F 17/2785; G06F 3/0482; G06F 16/9024; G06F 15/0291; G06F 16/316
See application file for complete search history.

(56) References Cited

U.S. PATENT DOCUMENTS

| | | | |
|---|---|---|---|
| 8,396,864 B1 | 3/2013 | Harinarayan et al. | |
| 8,463,821 B2 | 6/2013 | Lubbers et al. | |
| 8,560,599 B2 | 10/2013 | Hatami-Hanza | |
| 8,749,578 B2 | 6/2014 | Sheba et al. | |
| 9,116,995 B2* | 8/2015 | Koperski | G06F 16/285 |
| 2008/0114755 A1 | 5/2008 | Wolters et al. | |
| 2010/0004944 A1 | 1/2010 | Palaniappan | |
| 2016/0189028 A1* | 6/2016 | Hu | G06N 5/02 706/46 |

OTHER PUBLICATIONS

International Search Report and Written Opinion dated Nov. 10, 2015 for PCT Aplication No. PCT/IN2015/000060, Filed Jan. 30, 2015, 12 pages.

Hill, "Patented Book Writing System Creates, Sells Hundreds of Thousands of Books on Amazon", Singularity Hub, Dec. 13, 2012, 5 pages. <http://singularityhub.com/2012/12/13/patented-book-writing-system-lets-one-professor-create-hundreds-of-thousands-of-amazon-books-and-counting/>.

Paton, "University Students Shunning Books in Favour of Wikipedia", The Telegraph, May 27, 2014, 3 pages. <http://www.telegraph.co.uk/education/educationnews/10858288/University-students-shunning-books-in-favour-of-Wikipedia.html>.

Titova, "Book Written by Computer Hits Shelves", The St. Petersburg Times, Jan. 22, 2008, Issue #1341, 2 pages. <https://web.archive.org/web/20140217000856/http://www.sptimes.ru/story/24786>.

Wikipedia, "Wikipedia: Books", retrieved from Internet on May 13, 2019, 5 pages. <https://en.wikipedia.org/wiki/wikipedia:Books>.

* cited by examiner

_US 10,474,726 B2_

GENERATION OF DIGITAL DOCUMENTS

BACKGROUND

With an exponential growth of information world-wide, a pool of content on the web has been created for people to read and assimilate. The content may be provided through various electronic media such as eBooks, digital magazines, e-newspapers, and the like, which are in digital formats.

BRIEF DESCRIPTION OF THE DRAWINGS

The following detailed description references the drawings, wherein.

DETAILED DESCRIPTION

Figure 1:
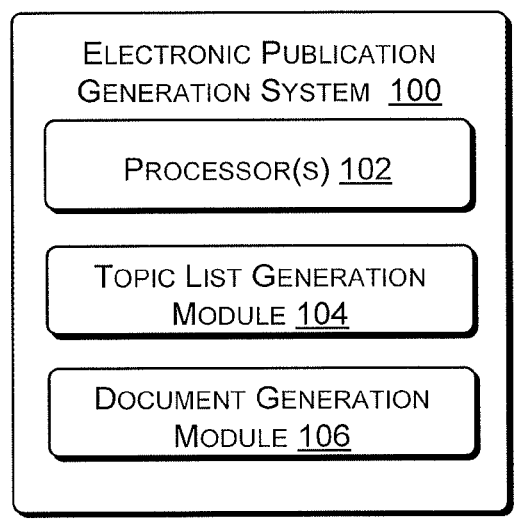
FIG. 1 is a block diagram of an example system for generation of a digital document.

Advances in computing technology have provided convenient and economical mechanisms to any person for creating and publishing their content on the Internet. Generally, a variety of tools are available to generate digital documents. For generating a digital document, such as an electronic book (commonly referred to as eBook), different topics and content corresponding to a subject for which the digital document is to be generated, may be provided by an author. However, determination of appropriate topics for generation of the digital document is subjective and involves manual steps. As such, generation of such digital documents is based on what an individual author already knows or what keywords the author uses to search for the appropriate topics on the Internet. As a result, some other topics which may be suitably informative for the desired subject may be overlooked for generation of the digital document. It may be the case that content and information related to a desired subject may be available in a knowledge store, such as an online or a digital encyclopedia. However, for generating a digital document, it may not be possible to go through the entire knowledge store to determine appropriate topics which may be considered as informative for the desired subject.

Approaches for generating a digital document are described. Examples of the digital document include, but are not limited to, an electronic book (eBook) and a webpage. The digital document is generated based on a digital content store. The digital content store may include structured digital content in an indexed form. The structured digital content may be considered as content arranged or organized as a plurality of topics. With each of the topics, appropriate content under that topic may be associated. In an example, the structured digital content may represent one or more web pages and each web page is structured to include one or more topics. In such a case, each topic may appear as a heading in the web page. Furthermore, each topic may be associated with content under its heading in the web page, wherein the content is providing information for the topic. According to an example, a topic may further include different subtopics, wherein each subtopic may be provided with content which provides information about that subtopic.

In accordance with one example implementation, for generation of a digital document, topic-based textual data is received through a user input. The topic-based textual data (also referred to as textual data) may correspond to textual content of a subject, or textual heading of a subject, or a textual heading of a topic in the subject, and the like, for which the desired digital document is to be generated. In one example, the topic-based textual data may be based on one of content of a book, an outline of a subject, a lesson plan, a table of contents of a book, content of a syllabus, and one or more topics provided as a string.

Subsequently, a list of seed topics may be generated. The seed topics may be generated based on the topic-based textual data and the structured digital content, or may be received from the user. The seed topics may be understood as topics that are related to the topic-based textual data. For instance, if the topic-based textual data provided by the user is indicative of a name of a subject, such as 'Avionics', for which the digital document is to be generated, then topics that are related to 'Avionics' are generated. In one example, the seed topics are generated based on scanning the structured digital content to determine topics that are related to the topic-based textual data. In another example, the user himself may provide the seed topics, i.e., topics related to 'Avionics', such as 'Autopilot', 'Satellite Navigation', Very High Frequency (VHF) Omnidirectional Range', and the like.

Based on the seed topics, a list of candidate topics may be determined. The seed topics may be considered as the bases, based on which the candidate topics may be generated. The candidate topics may be understood as the topics that are deemed suitable for generation of the digital document. For determining the candidate topics, topics which are related to the seed topics are identified from the structured digital content. The identified related topics are referred to as candidate topics. In an example, if the list of seed topics includes 10 seed topics, then based on those 10 seed topics, more number of related topics are identified from the structured digital content. Accordingly, the list of candidate topics may include multiple of seed topics, for example, 100 candidate topics, or 1000 candidate topics, or even more.

Once obtained, the list of candidate topics is processed to select relevant candidate topics from amongst the candidate topics. In an example, the relevant candidate topics are selected based on a pre-defined selection rule. The pre-defined selection may be based on a number of times each candidate topic appears in the topic-based textual data. For instance, if a candidate topic appears in the topic-based textual data, provided by the user, more than four times, the candidate topic is selected for generation of the digital document. Finally, the digital document is generated based on content associated with the relevant candidate topics selected from amongst the candidate topics, wherein the content is providing information for the relevant candidate topics.

With the approaches described above, cost, time, and manual labor associated with the generation of the digital document are substantially reduced. Further, the automated search over the structured digital content for generation of the candidate topics results in the inclusion of more relevant and critical content in the digital document. Also, while generating the digital document, it is possible to adapt the digital document according to needs of the user.

The various approaches are further described in conjunction with the following figures. It should be noted that the description and figures merely illustrate the principles of the present subject matter. Further, various arrangements may be devised that, although not explicitly described or shown herein, embody the principles of the present subject matter and are included within its scope.

The above approaches are further described with reference to FIGS. 1 to 5. It should be noted that the description and figures merely illustrate the principles of the present subject matter. It may be understood that various arrangements may be devised that, although not explicitly described or shown herein, embody the principles of the present subject matter. Further, while aspects of described system and method for generating a digital document can be implemented in any number of different computing systems, environments, and/or implementations, the examples and implementations are described in the context of the following system(s).

FIG. 1 is a block diagram of an example system for generation of a digital document. According to an example implementation, the system is an electronic publication generation system 100. In an example, the electronic publication generation system 100 may be deployed in an environment having a network-based system for data storage and communication. The electronic publication generation system 100 may be a computing device, such as a laptop computer, a desktop computer, a workstation or a server. The electronic publication generation system 100 is a system that allows a user to generate a customized digital document. The digital document generated through the electronic publication generation system 100 may be an eBook, a magazine, a newspaper, a webpage, a newsletter, and the like.

The electronic publication generation system 100 includes processor(s) 102. The processor(s) 102 may be implemented as microprocessors, microcomputers, microcontrollers, digital signal processors, central processing units, state machines, logic circuitries, and/or any devices that manipulate signals based on operational instructions. The functions of various elements shown in FIG. 1, including a functional block labeled as "processor(s)", may be provided through the use of dedicated hardware as well as hardware capable of executing machine readable instructions.

The electronic publication generation system 100 further includes a topic list generation module 104 and a document generation module 106, coupled to the processor 102. The topic list generation module 104 and the document generation module 106, amongst other things, may include routines, programs, objects, components, and data structures, which perform particular tasks or implement particular abstract data types. The topic list generation module 104 and the document generation module 106 may also be implemented as, signal processor(s), state machine(s), logic circuitries, and/or any other device or component that manipulates signals based on operational instructions. Further, the topic list generation module 104 and the document generation module 106 can be implemented by hardware, by computer-readable instructions executed by a processing unit, or by a combination thereof.

The electronic publication generation system 100 may either include or may be in communication with a data storage, which stores structured digital content. Within the data storage, the structured digital content may be organized in a hierarchical manner. The data storage may also include a content graph corresponding to the structured digital content. Within the content graph, each node may be connected to one or more other nodes. The connected nodes may indicate nodes corresponding to similar topics, or may also indicate various categories to which a topic under consideration may be categorized.

The electronic publication generation system 100 utilizes the data storage for generation of a desired digital document. In operation, the topic list generation module 104 receives topic-based textual data (hereinafter referred to as textual data) from a user. The user may be a person who wishes to generate a desired digital document pertaining to a specific topic, using the electronic publication generation system 100. In one example, the textual data may be one of content of a book, an outline of a subject, a lesson plan, a table of contents of a book, content of a syllabus, and one or more topics.

The topic list generation module 104 may determine a list of seed topics. The seed topics may be generated based on the textual data and the structured digital content. In another example, the list of seed topics may be provided as a user input. Once the seed topics are obtained, the topic list generation module 104 may generate a list of candidate topics based on the seed topics and the structured digital content. From the candidate topics, topic list generation module 104 may further obtain relevant topics. The document generation module 106 may subsequently generate a digital document based on the relevant topics and the content within the data storage. These and other aspects are further described in conjunction with FIG. 2.

Figure 2:
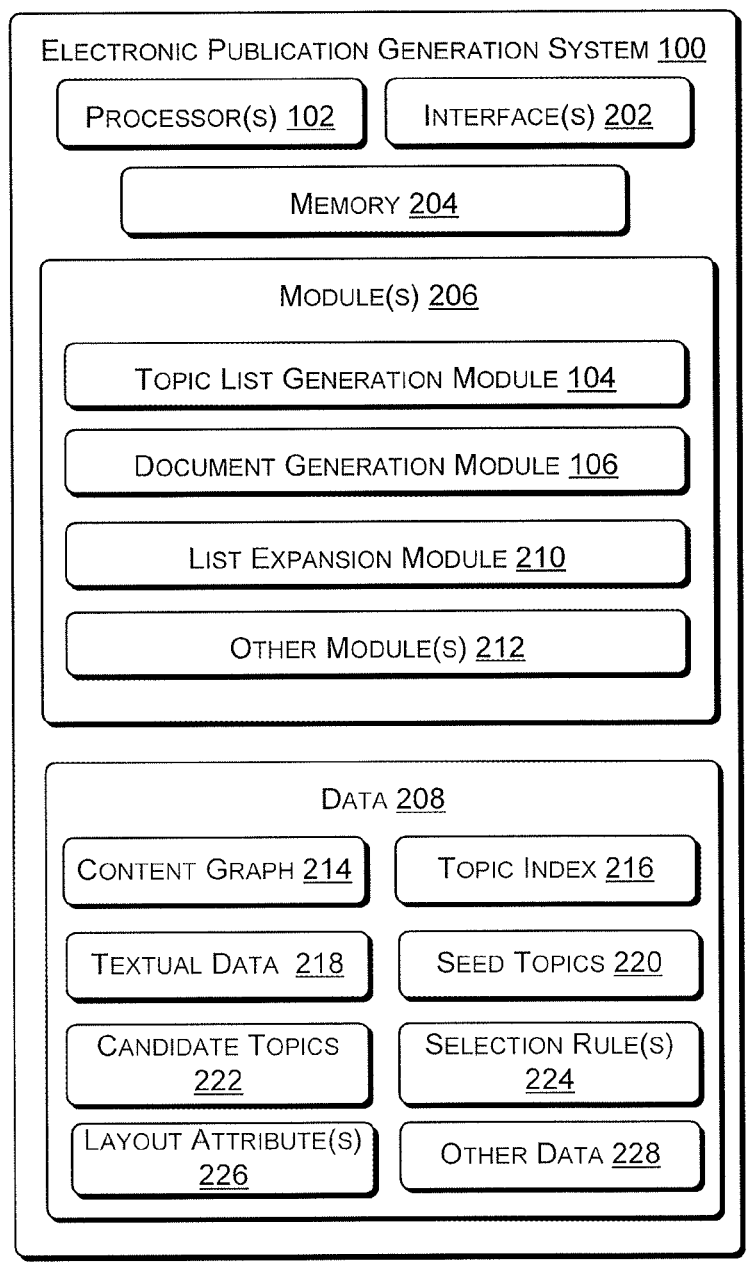
FIG. 2 is a block diagram of another example system for generation of the digital document.

FIG. 2 illustrates the electronic publication generation system 100 for generating digital documents, as per one example. Apart from the processor(s) 102, the electronic publication generation system 100 includes interface(s) 202. The interface(s) 202 may include a variety of commercially available interfaces, for example, interfaces for peripheral device(s), such as data input output devices, referred to as I/O devices, storage devices, network device. The I/O device(s) may include Universal Serial Bus (USB) ports, Ethernet ports, host bus adaptors, and their corresponding device drivers. The interface(s) 202 may facilitate the communication of the electronic publication generation system 100 with various communication and computing devices and various communication networks, such as networks that use a variety of protocols, for example, Hypertext Transfer Protocol (HTTP) and Transmission Control Protocol/Internet Protocol (TCP/IP).

The electronic publication generation system 100 further includes a memory 204 coupled to the processor(s) 102. Among other capabilities, the processor(s) 102 may fetch and execute computer-readable instructions stored in the memory 204. The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, and flash memories.

The electronic publication generation system 100 also includes module(s) 206 and data 208. The module(s) 206 include the topic list generation module 104, the document generation module 106, a list expansion module 210, and other module(s) 212. The other module(s) 212 may include programs or coded instructions that supplement applications or functions performed by the electronic publication generation system 100.

The data 208 includes content graph 214, topic index 216, textual data 218, seed topics 220, candidate topics 222, selection rule(s) 224, layout attribute(s) 226, and other data 228. The other data 228 may include data generated and/or saved by the modules 206 for providing various functionalities of the electronic publication generation system 100. Although the data 208 is shown internal to the electronic publication generation system 100, the data 208 can also be implemented external to the electronic publication generation system 100.

The generation of the digital document by the electronic publication generation system 100 is based on a digital content store. The digital content store may include structured digital content. The structured digital content may be considered as content arranged or organized as a plurality of topics. The structured digital content may be further processed to provide the structured digital content as a content graph having a plurality of nodes. Each node within the content graph may correspond to either a topic or a category. Furthermore, within the content graph each of the nodes may be connected to each other. For example, a node representing a topic may be linked to another topic node. The connection between such topic nodes may be considered to imply that such linked topics are similar to each other. A topic node may also be linked to a category node, thereby indicating that the topic is categorized in a category. In a similar manner, a topic node may be connected to many other topic nodes indicating that such linked topics are similar to each other. In the same way, a topic node may be linked to many other category nodes indicating that the topic is categorized under multiple categories. In one example, the content graph is stored as content graph 214. In another example, the structured digital content may be further indexed, which subsequently may be stored as the topic index 216. The structured digital content is indexed to generate one or more topic indices. A topic index includes a content topic and data corresponding to the content topic.

For generating the digital document, the electronic publication generation system 100 utilizes the content graph 214 and the topic index 216. In operation, the generation of the digital document may be initiated based on a user input. According to an example implementation, for generation of the digital document, the topic list generation module 104 may receive an instruction to generate the digital document from a user. The instruction may be received as an indication when the user interacts with the electronic publication generation system 100 using an input device. The interaction may include, clicking on a media generation interface using a mouse to initiate generation of the digital document or typing using a keyboard to write text in the media generation interface.

On initiating the generation of the digital document, topic-based textual data is obtained. The topic-based textual data may correspond to the type of content which is to be included as part of the digital document to be generated. The topic-based textual data may be obtained through a variety of sources. For example, the topic-based textual data (referred to as 'textual data'), may be provided by a user. In another example, the textual data may be in the form of content of a book, a lesson plan, a table of content of a book, content of a syllabus, and one or more topics. The textual data may be stored as textual data 218.

Continuing with the above example, the user may provide a syllabus in an electronic format as the textual data 218, to the electronic publication generation system 100. On receiving the syllabus, the topic list generation module 104 may convert the syllabus into text to identify chapters and sub-chapters. For identification of the chapters and the sub-chapters, the topic list generation module 104 may parse the syllabus based on one or more pre-defined rules. The pre-defined rules may prescribe a layout based on which chapters and sub-chapters may be identified. For example, terms specified in the syllabus having a lower indentation may be identified as chapters. Similarly, terms with higher indentation may be identified as sub-chapters. Accordingly, the chapters and the sub-chapters may be considered as an initial topic. It should be noted that the example for identifying topics is only for purposes of explanation and should not be construed as a limitation. Other approaches for identifying topics based on other types of textual data 218 may also be implemented without deviating from the scope of the present subject matter. Examples of such other forms of textual data 218 include, but are not limited to, lesson plans and table of content of a book. In another example, the predefined rules for identifying initial topics may be based on regular expressions.

It may also be the case that the textual data 218 may be specified through a single term depicting an initial topic. In such a case, the topic list generation module 104 may query the structured digital content to identify additional terms for forming the initial set of topics. For example, the topic list generation module 104 may extract a webpage corresponding to the topic. Further, the topic list generation module 104 may extract links to a main article and similar articles corresponding to the topic based on a pre-defined threshold of frequency of occurrence of the main article and similar articles. In an example, if the main article link itself has more than a pre-defined number of articles, the topic list generation module 104 may select the main article of the webpage as a chapter. The topic list generation module 104 may further expand the main article to determine the additional topics.

Thereafter, the topic list generation module 104 may determine a list of seed topics based on topics obtained through the textual data 218. For determining the seed topics, the topic list generation module 104 may retrieve the topic indices stored in the topic index 216. In an example, the topic list generation module 104 may determine the seed topics based on selecting pre-defined number of content topics from the topic index 216, as the seed topics. The seed topics may be subsequently stored within the electronic publication generation system 100 as the seed topics 220. In another example, the seed topics 220 may be provided as an input from a user.

The seed topics 220 may be further generated based on processing the textual data 218. In such a case, the topic list generation module 104 may also determine whether the initial topics are present in the textual data 218. In case an initial topic is present in the textual data 218, the topic list generation module 104 selects the initial topic as a seed topic. The topic list generation module 104 may also determine the seed topics based on generating n-grams from the textual data 218, where n may be 1 or 2 or 3, so on and so forth, and further determine whether the n-gram is present in the textual data 218. An n-gram may be understood as a contiguous sequence of n elements from a given sequence of text. In an example, the elements may be syllables, letters, words, and the like.

The generation of the digital document may continue with the topic list generation module 104 generating a list of candidate topics based on the seed topics 220 and the content graph 214. For identifying the candidate topics, the topic list generation module 104 may identify one or more categories to which each seed topic belongs based on the category links in the content graph 214. Upon identifying the categories, the topic list generation module 104 may determine topics similar to the each seed topic based on the content graph 214. In addition, the topic list generation module 104 may also determine whether each of the determined content topics belong to any categories as provided within the content graph 214. Upon determining, the topic list generation module 104 may identify the content topics as the candidate topics 222.

In one example, the topic list generation module 104 may obtain at least candidate topic based on selection rule(s) 224. The selection rule(s) 224 may include one or more rules or empirical conditions for selecting at least one candidate topic for generation of the digital document. For example, the selection rule(s) 224 provide a threshold value indicative of a number of content topics related to topics included in the textual data 218. In such cases, the topic list generation module 104 would select only such number of topics specified by way of the threshold value, which are related to the topics included in the textual data 218. Thereafter, the topic list generation module 104 may further determine whether each of the topics so obtained, are present in the list of candidate topics 222. Upon determining the content topic to be present in the list of candidate topics 222, the document generation module 106 selects the candidate topic for generation of the digital document.

The threshold value may also be based on other criteria, such as a length of structured digital content, number of words/sentences in the structured digital content, number of pictures on the structured digital content, and the like. Further, the threshold value may also be based on number of categories for which a candidate topic has to match with a seed topic. In an example, in cases when the textual data 218 and candidate topics 222 do not match, the document generation module 106 may compute longest subsequence of characters common between the textual data 218 and the candidate topics 222. The document generation module 106 may select a candidate topic from amongst the candidate topics 222 if Longest Common Subsequence (LCS) score is greater than a pre-defined threshold value. In one example, the pre-defined threshold value may be 15. Further, the document generation module 106 may compute dice coefficient between both the textual data 218 and the candidate topics 222. The document generation module 106 may select a candidate topic from amongst the candidate topics 222 if the dice coefficient is equal to pre-defined threshold level, for example 0.8. The document generation module 106 may also use other similarity measures, such as Jacquard similarity measure and Levenshtein distance to select a candidate topic from amongst the candidate topics 222.

According to an example implementation, the list expansion module 210 may generate a list of additional candidate topics based on determining from the structured digital content, topics similar to each selected candidate topic, hyperlinks to other topics, and articles for the selected candidate topic. Each additional candidate topic is associated with content corresponding to the additional candidate topic. Thereafter, the list expansion module 210 may threshold the additional candidate topics by a number of times they occur to select the additional candidate topics for generation of the digital document.

With all the candidate topics 222 determined, the document generation module 106 may compose the selected candidate topics and the selected additional candidate topics into the digital document based on the layout attributes 226. In an example, the layout attributes 226 may be defined by the user. The layout attributes 226 may be indicate of information, such as number of pages to be included in the digital document, format of page(s), layout of the page(s), and the like. The document generation module 106 generates the digital document based on content associated with the candidate topic selected from amongst the candidate topics and content associated with selected additional candidate topics. In one example, the document generation module 106 may obtain additional content corresponding to the candidate topics 222 from the topic index 216 or from the content graph 214. In another example, the document generation module 106 may also access external content repositories for accessing the content corresponding to the candidate topics 222 based on which the digital document is generated.

Figure 3:
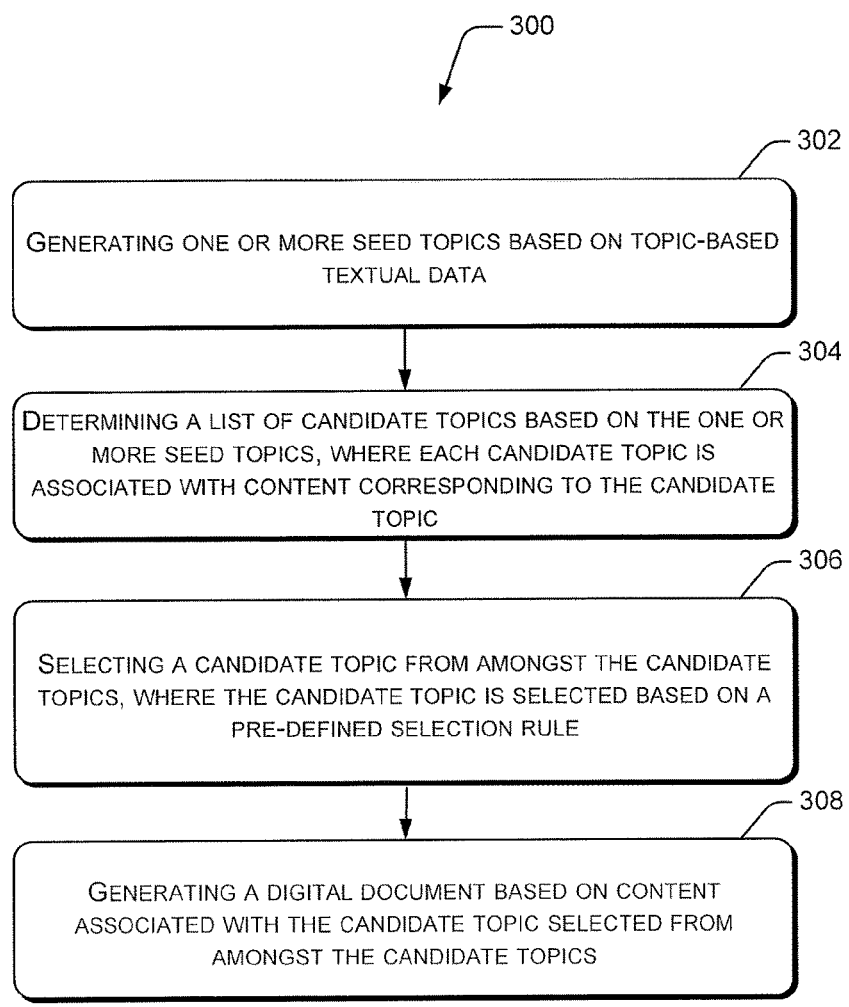
FIG. 3 is a flowchart of an example method for generating the digital document.
Figure 4:
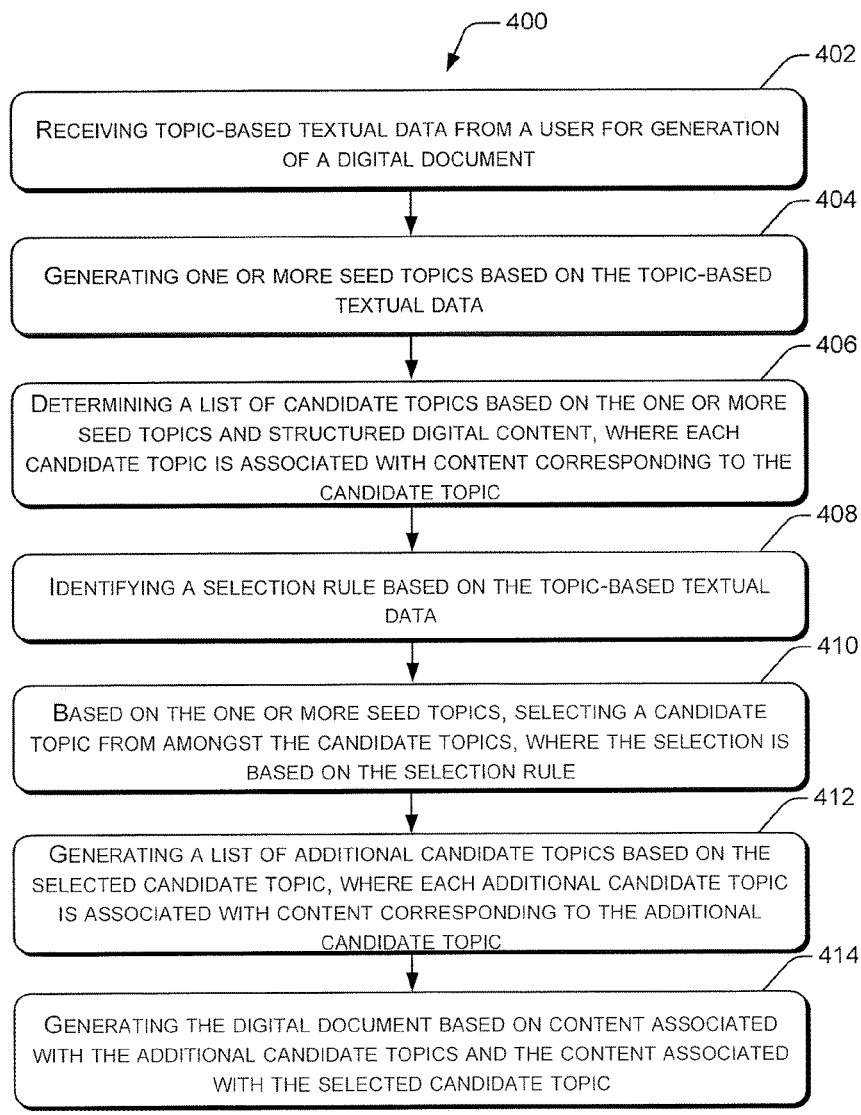
FIG. 4 is a flowchart of another example method for generating the digital document.

FIGS. 3 and 4 illustrate example methods 300 and 400, respectively, for generating a digital document, according to an implementation of the present subject matter. The order in which the methods are described is not intended to be construed as a limitation, and any number of the described method blocks may be combined in any order to implement the aforementioned methods, or an alternative method. Furthermore, methods 300 and 400 may be implemented by processing resource or computing device(s) through any suitable hardware, non-transitory machine readable instructions, or combination thereof.

It may also be understood that methods 300 and 400 may be performed by programmed computing devices, such as the electronic publication generation system 100 as depicted in FIGS. 1-2. Furthermore, the methods 300 and 400 may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Although, the methods 300 and 400 are described below with reference to the electronic publication generation system 100 as described above, other suitable systems for the execution of these methods can also be utilized. Additionally, implementation of these methods is not limited to such examples.

With reference to the method 300 as depicted in FIG. 3, at block 302, the method 300 includes generating one or more seed topics based on topic-based textual data. For example, the textual data 218 may include at least one of content of a book, a lesson plan, a table of contents of a book, content of a syllabus, and one or more topics. Further, the textual data 218 may be obtained by the electronic publication generation system 100 as user input. In an example, the topic list generation module 104 of the electronic publication generation system 100 may generate the seed topics 220 based on the textual data 218.

At block 304, a list of candidate topics is determined based on the one or more seed topics, where each candidate topic is associated with content corresponding to the candidate topic. For determining the candidate topics 222, one or more categories to which each seed topic 220 belongs may be identified based on category links in a pre-defined content graph 214. Upon identifying, content topics similar to the each seed topic 220 may be determined based on similar links in the content graph 214. Further, it may be determined whether each of the determined content topics belongs to any of the identified categories. Upon determining, the content topics are identified as the candidate topics 222. In an example, the topic list generation module 104 determines a list of candidate topics 222 based on the seed topics 220, where each candidate topic is associated with content corresponding to the candidate topic.

At block 306, a candidate topic from amongst the candidate topics is selected based on a pre-defined selection rule. In one example, the candidate topic 222 may be selected based on pre-defined selection rule(s) 224. The pre-defined selection rule(s) 224 may be based on a number of times the candidate topic 222 appears in the textual data 218. In an example, the document generation module 106 selects the candidate topic from amongst the candidate topics 222.

At block 308, a digital document is generated based on content associated with the candidate topic selected from amongst the candidate topics. In an example, the digital document may be an eBook, a magazine, a newspaper, a newsletter, a webpage, and the like. Further, the digital document may be generated based on layout attributes 226 defined by the user. The layout attributes 226 may be indicative of information such as number of pages to be included in the digital document, format of page(s), layout of the page(s), and the like. In an example, the document generation module 106 generates the digital document based on the content associated with the candidate topic selected from amongst the candidate topics 222.

With reference to method 400 as depicted in FIG. 4, at block 402, topic-based textual data is received from a user for generation of a digital document. The user may be a person who wishes to generate a desired digital document. As mentioned before, the digital document may be an eBook, a magazine, a newspaper, a newsletter, and the like, and the topic-based textual data may be one of content of a book, a lesson plan, a table of content of a book, content of a syllabus, and one or more topics. In an example, the topic list generation module 104 receives textual data 218 from the user for generation of the digital document.

At block 404, one or more seed topics are generated based on the topic-based textual data. The seed topics 220 may be generated based on selecting pre-defined number of content topics from the topics index 216. The selected content topics may be understood as the seed topics 220. In an example, the topic list generation module 104 may generate the seed topics 220 based on the textual data 218.

At block 406, a list of candidate topics is determined based on the one or more seed topics and structured digital content, where each candidate topic is associated with content corresponding to the candidate topic. For determining the candidate topics 222, one or more categories to which each seed topic 220 belongs may be identified based on category links in the content graph 214. Upon identifying, content topics similar to the each seed topic may be determined based on similar links in the content graph 214. Further, it may be determined whether each of the determined content topics belongs to any of the identified categories. Upon determining, the content topics are selected as the candidate topics 222. In an example, the topic list generation module 104 determines a list of candidate topics 222 based on the seed topics 220, where each candidate topic 222 is associated with content corresponding to the candidate topic 222.

At block 408, a selection rule is identified based on the topic-based textual data. In an example, the selection rule 224 may be based on a number of times a candidate topic 222 appears in the textual data 218. In another example, the selection rule 224 may be based on setting a threshold value. The threshold value is indicative of a number of content topics to be selected from one or more topic indices for selection of a candidate topic from amongst the candidate topics 222 for generation of the digital document. The threshold value may also be based on other criteria, such as a length of structured digital content, number of words/sentences in the structured digital content, number of pictures on the structured digital content, and the like. Further, the threshold value may also be based on number of categories for which a candidate topic has to match with a seed topic. In an example, the document generation module 106 identifies the selection rule 224 based on the textual data 218.

At block 410, based on the one or more seed topics, a candidate topic is selected from amongst the candidate topics, where the selection is based on the selection rule. In an example, the document generation module 106 selects the candidate topic from amongst the candidate topics 222.

At block 412, a list of additional candidate topics is generated based on the selected candidate topic, where each of the additional candidate topics is associated with content corresponding to the additional candidate topic. In an example, it may be determined from the structured digital content, topics similar to the candidate topic, hyperlinks to other topics, and articles for the selected candidate topic. Thereafter, the additional candidate topics may be threshold by a number of times they occur to select the one or more additional candidate topic for generation of the digital document. According to an example implementation, the list expansion module 210 generates the additional candidate topics based on the selected candidate topic.

At block 414, the digital document is generated based on the content associated with the additional candidate topics and content associated with the selected candidate topic. In an example, the document generation module 106 generates the digital document based on the content associated with the additional candidate topics and content associated with the selected candidate topic.

Figure 5:
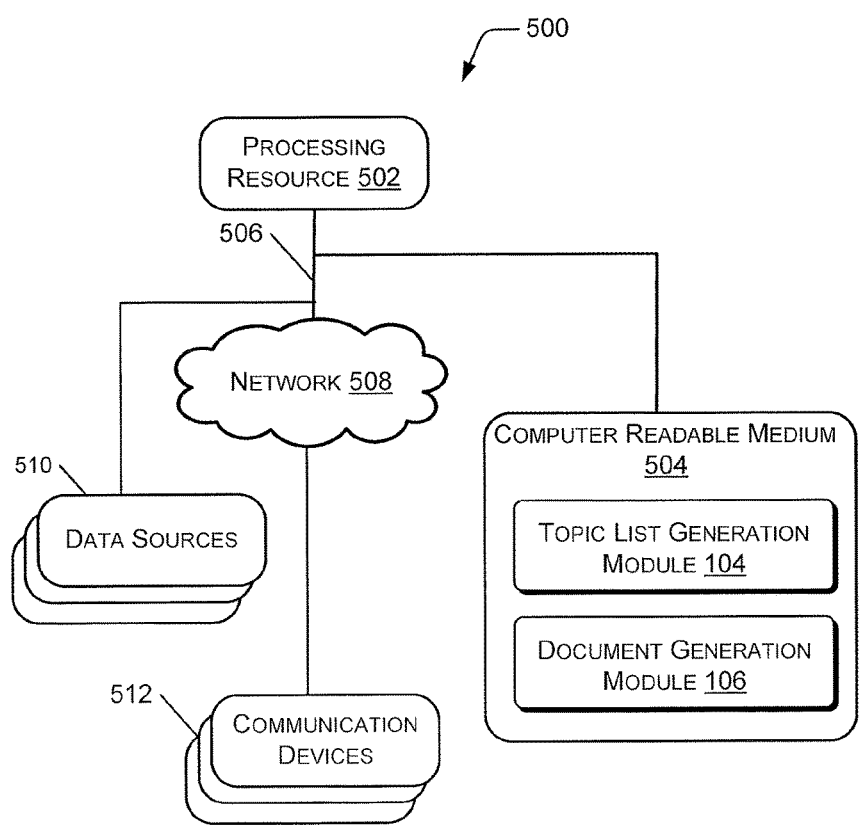
FIG. 5 is a block diagram of an example network environment implementing a non-transitory computer-readable medium, for generation of the digital document.

FIG. 5 illustrates a block diagram of an example network environment 500 implementing a non-transitory computer-readable medium, for generation of a digital document, in accordance with an example of the present subject matter. The network environment 500 may comprise at least a portion of a public networking environment or a private networking environment, or a combination thereof. In one implementation, the network environment 500 includes a processing resource 502 communicatively coupled to a non-transitory computer readable medium 504, hereinafter referred to as computer readable medium 504, through a communication link 506. In an example, the processing resource 502 can be a computing device, such as the electronic publication generation system 100.

The computer readable medium 504 can be, for example, an internal memory device of the computing device or an external memory device. In one implementation, the communication link 506 may be a direct communication link, such as any memory read/write interface. In another implementation, the communication link 506 may be an indirect communication link, such as a network interface. In such a case, the processing resource 502 can access the computer readable medium 504 through a network 508. The network 508 may be a single network or a combination of multiple networks and may use a variety of different communication protocols.

The processing resource 502 and the computer readable medium 504 may also be coupled to data sources 510 through the communication link 506, and/or to communication devices 512 over the network 508. The coupling with the data sources 510 enables in receiving the requested data in an offline environment, and the coupling with the communication devices 512 enables in receiving the requested data in an online environment.

In one implementation, the computer readable medium 504 includes a set of computer readable instructions, implementing the topic list generation module 104 and the document generation module 106. The set of computer readable instructions, referred to as instructions hereinafter, can be accessed by the processing resource 502 through the communication link 506 and subsequently executed to perform acts for generating the digital document. For discussion purposes, the execution of the instructions by the processing resource 502 has been described with reference to various components introduced earlier with reference to description of FIGS. 1 and 2.

On execution by the processing resource 502, the topic list generation module 104 may index structured digital content to generate one or more topic index. A topic index may include a content topic and data corresponding to the content topic. In an example, the structured digital content may represent web pages and each web page is structured to include one or more topics, wherein each topic is appearing as a heading in the web page. Further, the topic list generation module 104 may determine a list of seed topics based on textual data 218 received from a user. Subsequently, the topic list generation module 104 may generate a list of candidate topics 222 based on the seed topics 220, where each of the candidate topics corresponds to a content topic associated with the one or more topic indices. Further, each candidate topic is associated with content corresponding to the candidate topic.

According to an example implementation, the document generation module 106 may identify at least one selection rule 224 based on the textual data 218. In an example, the selection rule 224 is identified based on setting a threshold value. The threshold value is indicative of a number of content topics to be selected from the topic indices for selection of the candidate topic from amongst the candidate topics. Thereafter, based on the seed topics 220, the document generation module 106 selects at least one candidate topic from amongst the candidate topics 222. In an example, the document generation module 106 may select the candidate topic based on the selection rule 224. Upon selection, the document generation module 106 generates the digital document based on content associated with the candidate topic selected from amongst the candidate topics.

Although implementations of generation of digital documents have been described in language specific to structural features and/or methods, it is to be understood that the present subject matter is not necessarily limited to the specific features or methods described. Rather, the specific features and methods are disclosed and explained in the context of a few implementations for generation of digital documents.

I claim:

1. An electronic publication generation system comprising:
a processor;
a memory storing instructions that when executed by topic list generation module coupled to the processor cause the processor to: wherein the topic list generation module is to:
receive topic-based textual data from a user for generation of a digital document; determine a list of seed topics based on the topic-based textual data; generate a list of candidate topics based on the seed topics and structured digital content, wherein each candidate topic is associated with content corresponding to the candidate topic;
create a content graph corresponding to the structured digital content, wherein the content graph comprises similar topic links and category links, such that a similar topic link establishes a link between the content topic and content topics similar to the content topic, and a category link establishes a link between the content topic and categories to which the content topic belongs; and
generate the digital document based on content associated with at least one candidate topic selected from amongst the candidate topics and based on the content graph.

2. The electronic publication generation system as claimed in claim 1, wherein the digital document is one of an electronic book (eBook) and a webpage.

3. The electronic publication generation system as claimed in claim 1, wherein the instructions are executable to cause the processor to select the at least one candidate topic based on pre-defined selection rules.

4. The electronic publication generation system as claimed in claim 1, wherein the instructions are executable to cause the processor to further generate a topic index for the structured digital content, and wherein the topic index includes the content topic and data corresponding to the content topic.

5. The electronic publication generation system as claimed in claim wherein the instructions are executable to cause the processor to generate additional candidate topics based on the structured digital content for generation of the digital document, wherein each additional candidate topic is associated with content corresponding to the additional candidate topic.

6. The electronic publication generation system as claimed in claim 1, wherein the instructions are executable to cause the processor to generate the list of candidate topics based on:
for each seed topic of the seed topics, identifying, from the content graph, a category to which the seed topic belongs;
determining, from the content graph, one or more content topics similar to the seed topic;
identifying, from amongst the one or more content topics, a content topic that belongs to the category; and
selecting the content topic that belongs to the category as a candidate topic based on the identification.

7. A method comprising:
generating, by a processor, one or more seed topics based on topic-based textual data;
determining, by the processor, candidate topics based on the one or more seed topics, wherein each candidate topic is associated with content corresponding to the candidate topic;
selecting, by the processor, a candidate topic from amongst the candidate topics, wherein the candidate topic is selected based on a pre-defined selection rule;
generating, by the processor, a content graph corresponding to structured digital content, wherein the content graph comprises similar topic links and category links, such that a similar topic link establishes a link between a content topic and other content topics similar to the content topic, and a category link establishes a link between the content topic and categories to which the content topic belongs; and
generating, by the processor, the digital document based on the content associated with the candidate topic selected from amongst the candidate topics and based on the content graph.

8. The method as claimed in claim 7, wherein the topic-based textual data is at least one of content of a book, a lesson plan, a table of contents of a book, content of a syllabus, and one or more topics.

9. The method as claimed in claim 7 further comprising:
generating additional candidate topics based on structured digital content, wherein each additional candidate topic is associated with content corresponding to the additional candidate topic; and
generating the digital document based on the content associated with the additional candidate topics and the content associated with the candidate topic selected from amongst the candidate topics.

10. The method as claimed in claim 7 further comprising generating one or more topic indices for the structured digital content, wherein a topic index comprises the content topic and data corresponding to the content topic.

11. The method as claimed in claim 10, wherein the selecting the candidate topic from amongst the candidate topics is based on:
querying the one or more topic indices for each of the one or more seed topics to identify a pre-defined number of content topics;
determining, for each of the candidate topics, whether each of the pre-defined number of content topics is identical to the candidate topic; and
based on the determining, selecting the candidate topic for generation of the digital document.

12. A non-transitory machine-readable storage medium encoded with instructions executable by a processing resource to:
index structured digital content to generate one or more topic indices, wherein a topic index comprises a content topic and data corresponding to the content topic;
determine seed topics based on topic-based textual data received from a user;
generate candidate topics based on the seed topics, wherein each of the candidate topics corresponds to the content topic associated with the one or more topic indices, and wherein each candidate topic is associated with content corresponding to the candidate topic;
identify at least one selection rule based on the topic-based textual data; based on the seed topics, select at least one candidate topic from amongst the candidate topics, wherein the selection is based on the at least one selection rule;
generate a content graph corresponding to the structured digital content, wherein the content graph comprises similar topic links and category links, such that a similar topic link establishes a link between the content topic and content topics similar to the content topic, and a category link establishes a link between the content topic and categories to which the content topic belongs; and
generate a digital document based on the content associated with the at least one candidate topic selected from amongst the candidate topics and based on the content graph.

13. The non-transitory machine-readable storage medium as claimed in claim 12, wherein the at least one selection rule is identified based on setting a threshold value, wherein the threshold value is indicative of a number of content topics to be selected from the one or more topic indices for selection of the at least one candidate topic from amongst the candidate topics.

* * * * *